US010765977B2

(12) United States Patent
Baumann et al.

(10) Patent No.: US 10,765,977 B2
(45) Date of Patent: *Sep. 8, 2020

(54) FUEL FILTER INSERT, AND FUEL FILTER COMPRISING A PREFILTER ELEMENT AND A MAIN FILTER ELEMENT AND COMPRISING A WATER SEPARATING UNIT

(71) Applicant: Mann+Hummel GMBH, Ludwigsburg (DE)

(72) Inventors: Christoph Baumann, Moeglingen (DE); Lars Spelter, Ditzingen (DE); Idriss Razgani, Ludwigsburg (DE); Jonas Eble, Erlenbach (DE); Christopher Mueller, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 310 days.

This patent is subject to a terminal disclaimer.

(21) Appl. No.: 15/702,998

(22) Filed: Sep. 13, 2017

(65) Prior Publication Data
US 2018/0028949 A1 Feb. 1, 2018

Related U.S. Application Data

(63) Continuation of application No. PCT/EP2016/054821, filed on Mar. 7, 2016.

(30) Foreign Application Priority Data

Mar. 13, 2015 (DE) .................. 10 2015 003 163

(51) Int. Cl.
*B01D 35/26* (2006.01)
*F02M 37/24* (2019.01)
*F02M 37/44* (2019.01)
*B01D 36/00* (2006.01)
(Continued)

(52) U.S. Cl.
CPC ............. *B01D 35/26* (2013.01); *B01D 29/21* (2013.01); *B01D 29/58* (2013.01); *B01D 36/003* (2013.01);
(Continued)

(58) Field of Classification Search
CPC .. B01D 35/26; B01D 36/003; B01D 2201/46; B01D 2201/40; B01D 2201/34;
(Continued)

(56) References Cited

U.S. PATENT DOCUMENTS 2,098,725 A * 11/1937 Hurn ...................... B01D 35/16
210/132
3,312,350 A * 4/1967 Kasten ................. B01D 35/005
210/307

(Continued)

FOREIGN PATENT DOCUMENTS

CN 101961573 A 2/2011
CN 203777749 U 8/2014
(Continued)

*Primary Examiner* — David C Mellon
(74) *Attorney, Agent, or Firm* — James Hasselbeck

(57) ABSTRACT

A fuel filter insert for a fuel filter is provided with a prefilter element and a main filter element which are arranged one atop the other in an axial direction relative to a longitudinal axis of the fuel filter insert. The main filter element has a water separating unit configured to separate water contained in a fuel to be filtered. The water separating unit has a water discharge channel for water separated from the fuel, wherein the water discharge channel is extending in the axial direction at least partially through the prefilter element. A fuel filter with such a fuel filter insert has a filter housing accommodating the fuel filter insert and the water discharge channel of the fuel filter insert is fluidically connected with a water collecting chamber of the filter housing.

20 Claims, 3 Drawing Sheets

(51) Int. Cl.
  *B01D 29/21* (2006.01)
  *B01D 29/58* (2006.01)
(52) U.S. Cl.
  CPC ............ *F02M 37/24* (2019.01); *F02M 37/44* (2019.01); *B01D 2201/295* (2013.01); *B01D 2201/298* (2013.01); *B01D 2201/34* (2013.01); *B01D 2201/40* (2013.01); *B01D 2201/46* (2013.01)
(58) Field of Classification Search
  CPC ........ B01D 2201/298; B01D 2201/295; B01D 29/50; B01D 29/56; B01D 29/58; B01D 35/005; B01D 17/04; B01D 17/045; B01D 2201/20; B01D 2201/202; B01D 2201/291; B01D 2201/342; B01D 2201/347; B01D 36/001; B01D 29/21; F02M 37/24; F02M 37/44; F02M 37/32; F02M 37/42; F02M 37/22
  See application file for complete search history.

(56) References Cited

U.S. PATENT DOCUMENTS

| | | | |
|---|---|---|---|
| 3,390,778 A * | 7/1968 | Uhen | B01D 27/148 210/314 |
| 3,900,400 A | 8/1975 | Whitfield | |
| 5,017,285 A | 5/1991 | Janik et al. | |
| 5,766,468 A | 6/1998 | Brown et al. | |
| 7,285,149 B2 * | 10/2007 | Fornof | B60T 17/004 123/196 A |
| 2005/0000876 A1 * | 1/2005 | Knight | B01D 29/15 210/235 |
| 2005/0155585 A1 | 7/2005 | Bradford | |
| 2008/0135469 A1 * | 6/2008 | Fremont | B01D 29/21 210/234 |
| 2008/0197060 A1 * | 8/2008 | Girondi | B01D 29/114 210/86 |
| 2010/0314303 A1 * | 12/2010 | Reyinger | B01D 29/21 210/130 |
| 2011/0203982 A1 | 8/2011 | Braunheim | |
| 2017/0106317 A1 * | 4/2017 | Stamey, Jr. | B01D 29/15 |
| 2017/0204821 A1 * | 7/2017 | Willems | B01D 36/003 |

FOREIGN PATENT DOCUMENTS

| | | |
|---|---|---|
| DE | 202006004527 U1 | 8/2007 |
| DE | 102008048228 A1 | 1/2010 |
| EP | 1260260 A1 | 11/2002 |
| WO | 2006070221 A1 | 7/2006 |
| WO | 2007110049 A1 | 10/2007 |

* cited by examiner

FUEL FILTER INSERT, AND FUEL FILTER COMPRISING A PREFILTER ELEMENT AND A MAIN FILTER ELEMENT AND COMPRISING A WATER SEPARATING UNIT

CROSS-REFERENCE TO RELATED APPLICATIONS

This application is a continuation application of international application No. PCT/EP2016/054821 having an international filing date of 7 Mar. 2016 and designating the United States, the international application claiming a priority date of 13 Mar. 2015, based on prior filed German patent applications No. 10 2015 003 163.5, the entire contents of the aforesaid international application and the aforesaid German patent application being incorporated herein by reference.

BACKGROUND OF THE INVENTION

The invention concerns a fuel filter insert and a fuel filter comprising a prefilter element and a main filter element as well as comprising a water separating unit.

DE 10 2008 048 228 A9 discloses a fuel filter with a fuel filter insert comprising a prefilter element and a main filter element that are arranged one behind the other in axial direction relative to the longitudinal axis of the fuel filter. The fuel prefiltered by the prefilter element is pumped by means of a fuel pump, arranged outside of the filter housing, to the main filter element.

U.S. Pat. No. 3,900,400 B discloses a fluid filter with a filter housing in which two filter elements are arranged one atop the other in the direction of the longitudinal axis of the fluid filter and can be exchanged independent of each other. Between the two filter elements, an inflow channel for the fluid is formed that is axially delimited by an end disc of a lower filter element and by a housing clamping plate supported on the end disc resiliently by a spring. By means of the housing clamping plate, the upper one of the two filter elements is brought into seal-tight contact on a housing cover of the filter housing.

EP 0 852 158 A1 discloses a fuel filter with two filter elements that are arranged fluidically one behind the other and are arranged one atop the other in the direction of the longitudinal axis of the fuel filter.

WO 2006/070221 A1 discloses a further fuel filter with a prefilter element and a main filter element which are arranged concentric relative to the longitudinal axis of the fuel filter.

Similar fuel filters are disclosed in DE 20 2006 004 527 U1 and EP 1 485 605 B1.

The known filter systems enable an effective removal of particulate contaminants contained in the fuel. However, in particular diesel fuel comprises in practice often a relevant water content that can cause damage to or malfunction of high pressure fuel injection systems or diesel engines.

SUMMARY OF THE INVENTION

Object of the invention is therefore to provide a fuel filter insert with a prefilter element and a main filter element as well as a fuel filter which, while providing a compact and simple configuration as well as a simple handling, enable additionally a removal of water contained in the fuel.

The object concerning the fuel filter insert is solved by a fuel filter insert for a fuel filter, comprising a prefilter element and a main filter element which are arranged one atop the other in an axial direction relative to a longitudinal axis of the fuel filter insert, wherein the main filter element comprises a water separating unit for separating water contained in the fuel, and wherein the water separating unit comprises a water discharge channel for the water separated from the fuel which is extending in axial direction at least partially through the prefilter element.

The fuel filter according to the invention comprises a filter housing and a fuel filter insert, of the kind described above, arranged therein, wherein the water discharge channel of the fuel filter insert is fluidically connected with a water collecting chamber of the filter housing.

Further embodiments of the invention are disclosed in the description as well as in the claims.

The fuel filter insert according to the invention enables an efficient separation of particulate contaminants contained in the fuel due to the two filter elements. In this context, the prefilter element can advantageously be embodied as a coarse filter for filtering coarser particulate contaminants and the main filter element as a fine filter for filtering smaller particulate contaminants from the fuel. In this respect, the filter media of the prefilter element and of the main filter element can differ from each other in particular with respect to their pore size. Due to the arrangement of the two filter elements in accordance with the invention, a simple constructive configuration as well as a particularly simple handling of the fuel filter insert can be enabled in this context. The water separating unit which is integrated into the main filter element enables moreover the separation of water contained in the fuel without thereby enlarging the size of the fuel filter insert or of a filter housing for receiving the fuel filter insert. This is so because the water separation unit is arranged in an inner constructive space of the fuel filter insert that is existing anyway. Moreover, the prefilter element and the main filter element together with the water separating unit can be configured as a modular unit so that the handling of the fuel filter insert during installation in a filter housing or during its exchange is simplified.

According to a preferred embodiment of the invention, the water discharge channel is delimited in radial direction on the outer side by a wall element which is extending away from the main element in axial direction. The wall element in this context is preferably attached to a lower end disc of the main filter element, in particular integrally formed thereat. In addition to the manufacturing-technological advantages resulting therefrom, a particularly cost-efficient manufacture of the fuel filter insert is also enabled in this way. In addition, end discs of filter elements are comprised in general of a relatively bending-stiff plastic material so that the wall element, which is formed together with the end disc as one piece, comprises a sufficiently high mechanical loadability for mounting the fuel filter insert in a filter housing in order to connect it with its free end section seal-tightly to housing structures of the filter housing. Accordingly, in accordance with the invention, the wall element can delimit together with the lower end disc of the prefilter element that is facing away from the main filter element a receiving slot that serves for receiving a water discharge socket of a filter housing.

As an alternative to the configuration of a receiving slot, the wall element can be connected seal-tightly to the lower end disc. The sealing action on a housing socket or water separating socket in this case can be realized e.g. by means of a sealing element which is arranged on the wall element inwardly in radial direction.

The water separating unit comprises advantageously a water separating gap which is fluidically connected with one end to the water discharge channel. Such a water separating gap enables precipitation of the water contained in the fuel in downward direction and is advantageous with respect to the separating efficiency.

According to a preferred embodiment of the invention, the water separating gap is arranged between a screen tube and a filter medium of the main filter element. The screen tube serves as final separator for the water contained in the fuel and enables an even further improved water separation.

The water separating efficiency of the fuel filter element can be even further improved when the water separating unit comprises a coalescing medium. By means of the coalescing medium, smaller water droplets can be combined to larger water droplets so that they can precipitate more easily due to the force of gravity. For the purpose of a separation efficiency as great as possible, the coalescing medium can be arranged fluidically downstream of a filter medium of the main filter element. The coalescing medium can be configured, as needed, as a single layer or can be multi-layered.

According to the invention, with respect to a particularly compact configuration of the fuel filter insert, between the prefilter element and the main filter element a flow channel for the fuel which has been prefiltered by the prefilter element can be arranged which is immediately delimited in axial direction by end discs, correlated with each other, of the prefilter element and of the main filter element. A simplified constructive configuration of the fuel filter element as a whole results in this way. Moreover, the fuel filter insert can be manufactured cost-efficiently. Handling of the fuel filter element during installation in a filter housing of a fuel filter or during its exchange can be further simplified in this context.

For a particularly simple and safe exchange of the prefilter element and the main filter element, the end discs of the prefilter element and of the main filter element which are correlated with each other and delimit the flow channel can be connected with each other, preferably embodied as one piece with each other, for a common removal of the main filter element and prefilter element. In this way, the geometry of the flow channel as well as a reliable positioning of the end discs in the filter housing relative to a fuel outlet of the filter housing can be simplified. The two end discs can be embodied in particular as an injection molded plastic part. This provides cost-technical and manufacturing-technological advantages. Moreover, the fuel filter insert that is embodied as a single modular unit facilitates handling.

The two end discs in this context can be in particular connected to each other by one or a plurality of distance elements that are arranged between the two end discs and are attached to the two end discs, in particular integrally formed thereat. It is understood in this context that the flow channel in radial direction may not be completely blocked by the distance element(s).

The two end discs of the prefilter element and of the main filter element that delimit the flow channel can each comprise a (radial) sealing element for the purpose of a reliable sealing action of the flow channel relative to a filter housing. The sealing element is comprised advantageously of an elastomer. In this way, manufacturing tolerances of the prefilter element as well as of the main filter element/filter housing or contaminants which are adhering to the inside of the filter housing can be compensated.

The prefilter element and the main filter element can each comprise a filter medium arranged annularly about the longitudinal axis of the fuel filter insert. The filter medium in this context is preferably supported inwardly on a grid-shaped support tube in order to prevent a collapse of the filter medium upon flow through the filter medium from the exterior to the interior in radial direction. The filter media in this context can be embodied as a filter bellows folded in a star shape.

The fuel filter according to the invention comprises a filter housing in which a fuel filter insert as explained above is arranged. The water discharge channel of the fuel filter insert is fluidically connected with a water collecting chamber of the filter housing. The water discharge channel comprises in this context preferably a wall that is fluid-tight as a whole in order to provide an additional calming zone in which the water separated from the fuel can precipitate.

It is understood that the filter housing must be configured to be openable for the exchange of the fuel filter insert. The filter housing comprises for this purpose preferably a filter cup with a (single) insertion opening for the fuel filter insert which can be closed off by means of a housing cover. The housing cover can be screwable onto the filter cup or can be fastened in other ways to the filter cup.

For the purpose of a simplified mounting of the fuel filter insert in the filter housing, the filter housing can comprise a water discharge socket which is fluidically connected with the water collecting chamber. The water discharge socket extends advantageously seal-tightly into the aforementioned receiving slot between the wall element and the lower end disc of the prefilter element.

When filtering fuels, air contained therein or physically dissolved gases may degas. For this reason, the fuel filter according to the invention can comprise a venting tube. In this context, the water discharge channel of the fuel filter element according to the invention can be delimited in radial direction on the inner side by a tube element that is part of a venting tube arranged, preferably centrally, in the interior of the fuel filter insert or part of a screen tube of the water separating unit. In the first case, the venting tube thus provides a double function.

According to the invention, the venting tube, preferably by means of the tube element, can be fastened (permanently) to the filter housing, in particular can be locked thereat or screw-connected therewith. Thus, the venting tube, as a lifetime component, remains in the filter housing when exchanging the prefilter element and main filter element. This has cost advantages and saves resources.

The venting tube can axially project with its inlet opening past an upper end disc of the main filter element or can end flush, or substantially flush, with the upper end disc of the main filter element. In this way, a safe venting of the main filter element is ensured.

The venting tube opens with the other end preferably in a fuel return of the filter housing through which the fuel can be returned to a fuel tank. The venting tube can be provided in this context with a throttle in order to counteract a retrograde introduction of contaminants into the region of the main filter element.

According to an embodiment of the invention, the end discs, which are delimiting the flow channel, of the prefilter element and main filter element are seal-tightly resting against the inner side of the filter housing. The flow channel in this context is fluidically connectable to a fuel pump by means of a lateral fuel outlet embodied on the filter housing in order to pump the fuel that has been prefiltered by the prefilter element through a fuel inlet of the filter housing, preferably arranged laterally, to the main filter element.

For an exchange of the fuel filter insert, the fuel filter according to a preferred further embodiment of the invention comprises in the filter housing a fuel discharge channel arranged below the fuel filter insert, wherein, in operating position of the fuel filter insert in the filter housing, a respective raw side of the prefilter element and of the main filter element is sealed by a seal-tight contact of the fuel filter insert on the filter housing relative to the fuel discharge channel and wherein the raw side of the main filter element is connectable via the raw side of the prefilter element to the fuel discharge channel by an axially oriented movement of the fuel filter insert out of its operating position. In this way, additional discharge channels for the fuel are not needed.

DETAILED DESCRIPTION

Figure 1:
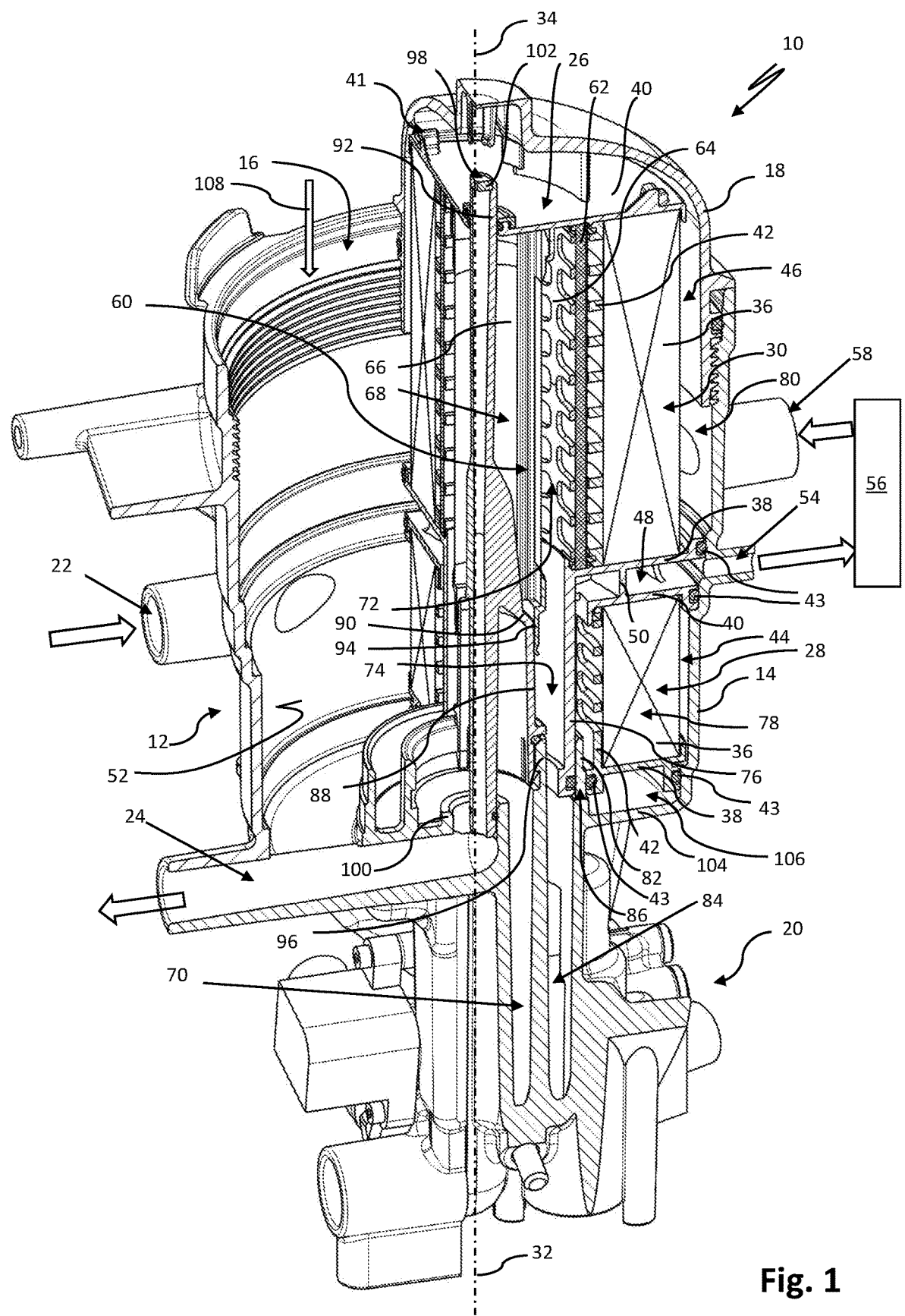
FIG. 1 shows in a perspective section illustration a fuel filter with a filter housing and a fuel filter insert arranged therein and comprising a prefilter element and a main filter element.
Figure 2:
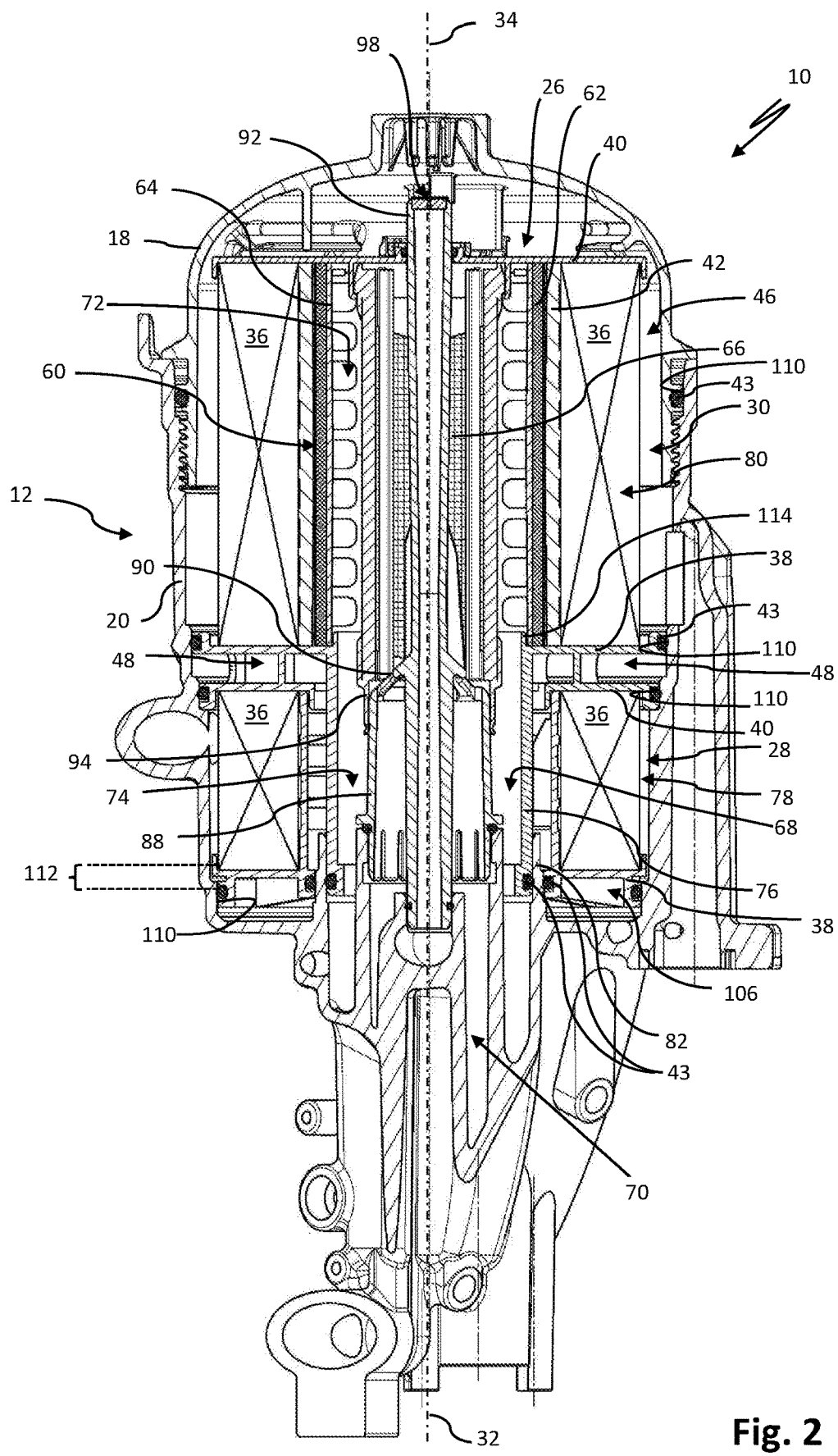
FIG. 2 shows the fuel filter of FIG. 1 in a longitudinal section view.

In the FIGS. 1 and 2, a fuel filter 10 for filtering out contaminants contained in fuel, in particular diesel fuel, is illustrated. The fuel filter 10 is suitable, for example, for use in commercial vehicles with internal combustion engine.

The fuel filter 10 comprises an openable filter housing 12 with a filter cup 14 and with an insertion opening 16 and with a housing cover 18 for closing off the filter cup 14. The filter cover 18 can be screwed into the filter cup 14. A different type of attachment of the filter cover 18 on the filter cup 14 is conceivable. The filter housing 12 can be comprised, for example, of metal or of a plastic material. At the lower end of the filter housing 12, a so-called filter head 20 is formed. The fuel filter 10 is thus designed in a generally known manner for an upright arrangement in operation.

The filter housing 12 comprises a fuel inlet 22 which serves for supplying the fuel to be filtered, for example, from a fuel tank (not illustrated), to the fuel filter 10. A fuel return 24 of the filter housing 12 serves for returning contaminated fuel, e.g., to the aforementioned fuel tank.

In the interior of the filter housing 12, a fuel filter insert 26 is arranged. The fuel filter insert 26 comprises a prefilter element 28 and a main filter element 30. The two filter elements 28, 30 are arranged in the direction of the longitudinal axis 32 of the fuel filter one atop the other in the filter housing 12. The longitudinal axis 32 of the fuel filter coincides with the longitudinal axis 34 of the fuel filter insert 26. The main filter element 30 is fluidically arranged downstream of the prefilter element 28. In other words, in operation the fuel to be filtered flows presently first through the prefilter element 28 arranged at the bottom in the filter housing 12 and subsequently through the main filter element 30 which is arranged above the prefilter element 28.

The prefilter element 28 and the main filter element 30 each are designed as round filter elements with a filter medium 36 which is annularly arranged relative to the longitudinal axis 34 of the fuel filter insert 26. The filter medium 36 of the prefilter element 28 as well as of the main filter element 30 can be flowed through by the fuel to be filtered in a radial direction relative to the longitudinal axis 34 of the fuel filter insert 26 from the exterior to the interior. The filter media 36 each are embodied as a filter bellows folded in a star shape and are secured between a lower and an upper end disc 38, 40 of the respective filter element. The upper end disc 40 of the main filter element 30 can be detachably coupled or is detachably coupled by a bayonet connection 41 (snap connection or something similar) with the housing cover 18. For radial inner support of the filter media 36 of the prefilter element 28 as well as of the main filter element 30, a grid-shaped support tube 42 is provided. The filter media 36 are resting inwardly on the respective support tube, preferably immediately.

The end discs 38, 40, correlated with each other, of the prefilter element 28 and of the main filter element 30, i.e., the lower end disc 38 of the main filter element 30 and the upper end disc 40 of the prefilter element 28, are arranged spaced apart from each other in axial direction. These two end discs 38, 40 are resting sealingly (fluid-tightly) by sealing elements 43 against the inner side of the filter housing 12, respectively. The two end discs 38, 40 serve therefore as sealing discs by means of which the interior of the filter housing 12 in axial direction is divided into a prefilter chamber 44 comprising the prefilter element 28 and a main filter chamber 46 comprising the main filter element 30. Between the upper end disc 40 of the prefilter element 28 and the lower end disc 38 of the main filter element 30, a flow channel 48 for the fuel that has been prefiltered by the prefilter element 28 is arranged. The flow channel 48 is immediately delimited by the end discs 38, 40, correlated with each other, of the prefilter element 28 and main filter element 30 in axial direction.

The upper end disc 40 of the prefilter element 28 and the lower end disc 38 of the main filter element 30 are connected to each other for common removal of the main filter element 30 and prefilter element 28, in particular are formed together as one piece and can be embodied in particular as injection molded plastic part. As can be seen in FIGS. 1 and 2, between the two end discs distance elements 50 are arranged that are connected to the two end discs, respectively, in particular integrally formed thereon.

The flow channel 48 is substantially embodied in annular configuration and in radial direction is fluidically connected with the inner wall 52 of the filter housing 12. The flow channel 48 at the outlet side is fluidically connected to a lateral (radially) arranged fuel outlet 54 of the filter housing 12. A fuel pump 56 is connectable to the fuel outlet 54. The fuel pump 56 serves to suck the contaminated fuel into the prefilter chamber 44 and through the prefilter element 28 and to pump the prefiltered fuel that has been guided out of the filter housing 12 by means of the fuel inlet 58 of the filter housing 12 into the main filter chamber 46 of the filter housing 12 again. This is done in order to guide the prefiltered fuel through the filter medium 36 of the main filter element 30. The fuel inlet 58 is arranged axially displaced relative to the fuel outlet 54 of the filter housing 12.

The main filter element 30 comprises a water separating unit 60 for separating water contained in the fuel. The water separating unit 60 comprises a coalescing medium 62 that is arranged in an annular shape about the longitudinal axis 34 of the fuel filter insert 26. The coalescing medium 62, as shown in FIGS. 1 and 2, is arranged in particular fluidically downstream of the filter medium 36 of the main filter element 30. In this context, the coalescing medium 36 is resting advantageously inwardly against a central tube 64 so that it does not collapse when loaded with pressure in operation of the fuel filter 10. The central tube 64 is arranged inside the support tube 42 and coaxial to the longitudinal axis 34 of the fuel filter insert 26. The coalescing medium 62 is thus arranged between the central tube 64 and the support tube 42 of the filter medium 36 of the main filter element 30.

The coalescing medium 62, as needed, can be embodied as a single layer or multi-layered and can be comprised of a nonwoven, for example.

As can be seen in FIGS. 1 and 2, a screen tube 66 is arranged within the central tube 64. The screen tube 66 serves functionally as a final separator for the water contained in the fuel. The screen tube 66 is arranged so as to extend coaxially relative to the longitudinal axis 34 of the fuel filter insert 26. The interior of the screen tube 66 is fluidically connected by a fuel discharge channel 68 extending in axial direction partially through the prefilter element 28 with a fuel channel 70 of the filter housing 12. The fuel which has been filtered by the prefilter element 28 and main filter element 30 and from which water has been removed at least partially flows in operation from the interior of the screen tube 66 through the fuel discharge channel 68 and the fuel channel 70 of the filter housing 12 in downward direction out of the fuel filter insert 26.

An annular water separating gap 72 is formed between the screen tube 66 and the coalescing medium 62 or the central tube 64. The water separating gap 72 is configured to be open in downward direction and is fluidically connected with one end with a water discharge channel 74 extending lengthwise.

At the lower end disc 38 of the main filter element 30, a substantially tubular wall element 76 is attached, in particular integrally formed, which in axial direction is extending away from the lower end disc 38 of the main filter element 30 in the direction of the filter head, i.e., in downward direction. The wall element 76 extends in axial direction to the level of the lower end disc 38 of the prefilter element 28 into the prefilter element 28. The wall element 76 delimits the prefilter chamber 44 in radial direction on the inner side and separates it relative to the water discharge channel 74 of the fuel filter insert 26. In other words, the water discharge channel 74 for the water separated from the fuel is immediately delimited outwardly in radial direction by the tubular wall element 76.

As a whole, the wall element 76 thus separates from each other a low-pressure region 78, comprising the prefilter element 28, and a high-pressure region 80, comprising the main filter element 30, of the fuel filter insert 26.

The water discharge channel 74 in axial direction can be extending entirely or partially through the prefilter element 28 and is fluidically connected by a housing socket or water discharge socket 82 of the filter housing 12 with a water discharge channel or water collecting chamber 84 of the filter housing 12.

The tubular wall element 76 and the lower end disc 38 of the prefilter element 28 delimit together a receiving slot 86 into which the housing socket or water discharge socket 82 is projecting seal-tightly in axial direction. The wall element 76 is resting seal-tightly by a sealing element 43 on an inner side of the water discharge socket 82 and the lower end disc 38 of the prefilter element 28 by a further sealing element 43 on the exterior side of the water discharge socket 82. In this way, the low-pressure region or the prefilter chamber 44 is sealed relative to the high-pressure region or the water discharge channel 74.

In radial direction, the water discharge channel 74 is delimited on the inner side by a tubular element 88. The tubular element 88 forms at the same time a radial outward boundary of the fuel discharge channel 68. One end of the tubular element 88 is integrally formed on a centrally arranged venting tube 92 of the fuel filter 10 by means of a connecting section 90 that is extending at a slant relative to the longitudinal axis 34 of the fuel filter insert 26 and is fenestrated (not illustrated). Alternatively, the tubular element can also be formed as a part of the screen tube 66 of the fuel filter insert 26.

A free end section of the screen tube 66 is formed as a sealing lip or as a sealing collar 94 and is resting seal-tightly on the exterior of the tubular element 88 about the entire circumference. The tubular element 88 of the venting tube 92 with the other end, i.e., its lower end, is locked (or screw-connected) with a fuel discharge socket 96 of the filter housing 12 and is resting on the inner side seal-tightly against it by means of a sealing element 43.

The venting tube 92 serves for venting the main filter element 30 or the main filter chamber 46 and extends coaxially to the longitudinal axis 34 of the fuel filter insert 26 through the latter. The venting tube 92 with its inlet opening 98 at one end can axially project past the upper end disc 40 of the main filter element 30. The inlet opening 98 of the venting tube 92 in this case is arranged between the upper end disc 40 of the main filter element 30 and the housing cover 18. It is understood that the venting tube 92 can also be arranged flush or substantially flush with the upper end disc 40 of the main filter element 30. The venting tube 92 projects seal-tightly with the other end into a venting socket 100 of the filter housing 12. The venting socket 100 can be fluidically connected with the fuel return 24 of the filter housing 12. In operation of the fuel filter 10, in the region of the main filter chamber 46 air that is contained in the fuel or degassed substances of the fuel can be evacuated in this way by means of the venting tube 92 and the fuel return 24 of the filter housing 12 out of the filter housing 12. For safety reasons, the venting tube 92 can be provided with a throttle 102, for example, in the region of its inlet opening 98.

The prefilter chamber 44 is delimited in downward direction by a housing bottom 104 of the filter housing 12. In its illustrated mounted state, the prefilter element 28 is arranged axially spaced apart from the housing bottom 104. In this way, between the lower end disc 38 of the prefilter element 28 and the housing bottom 104 a fuel discharge channel 106 is formed or defined. The fuel discharge channel 106 surrounds the longitudinal axis 34 of the fuel filter housing 12 and is open toward the fuel return 24 of the filter housing 12, i.e., is fluidically connected therewith.

The filter cup 14 comprises an inner cross section which is tapering axially in the direction toward the housing bottom 102, i.e., in the insertion direction 108 of the fuel filter insert 26, in a step-wise manner. In this way, the filter housing 12 comprises sealing surface sections 110 in the region of its inner wall 52 for the seal-tight contact of the end discs 38, 40 of the fuel filter insert 26; the sealing surface sections 110 are spaced less far relative to the longitudinal axis 34 of the fuel filter element 25 with increasing spacing from the insertion opening 16 of the filter housing 12 in the direction of the housing bottom 104. The sealing elements 43 of the lower end disc 38 of the main filter element 30 as well as of the two end discs 38, 40 of the prefilter element 28 are differently spaced apart from the longitudinal axis 34 of the fuel filter insert 26 in a manner corresponding therewith and are resting seal-tightly against the sealing surface sections 110 of the filter cup 14 in the illustrated operating position of the fuel filter insert 26 in the filter housing 12. In this way, the fuel filter insert 26 can be inserted in a simplified manner and without unnecessary overstressing of its sealing elements 43 into its operating position in the filter housing 12.

For an exchange of the fuel filter insert 26, the latter is moved axially out of the filter cup 14 opposite to the insertion direction 108. As soon as the fuel filter insert 26 has been moved by an axial travel stroke 112 (see FIG. 2) from its illustrated installed position into the drainage position, the sealing elements 43 of the lower and the upper end discs 38, 40 of the prefilter element 28 as well as of the lower end disc 38 of the main filter element 30 are removed from the respective sealing position on the filter housing 12 or the water discharge socket 82. Accordingly, the main filter chamber 46 is fluidically connected via the prefilter chamber 44 with the fuel discharge channel 106. In this way, the raw-side fuel can flow from the main filter chamber 46 through the prefilter chamber 44, together with the raw-side fuel contained therein, into the fuel discharge channel 106, following the force of gravity. Through the fuel discharge channel 106, the fuel can flow to the fuel return 24.

It should be noted that the axial length of the housing-associated water discharge socket 82 is dimensioned such that the sealing element 43 of the wall element 76 in the drainage position of the fuel filter insert 26 is still seal-tightly contacting the water discharge socket 82. In this way, it is ensured that the fuel from the prefilter chamber 44 does not reach the clean side of the fuel filter 10, here the water discharge (socket) or the fuel discharge socket 96 of the fuel channel 70.

Figure 3:
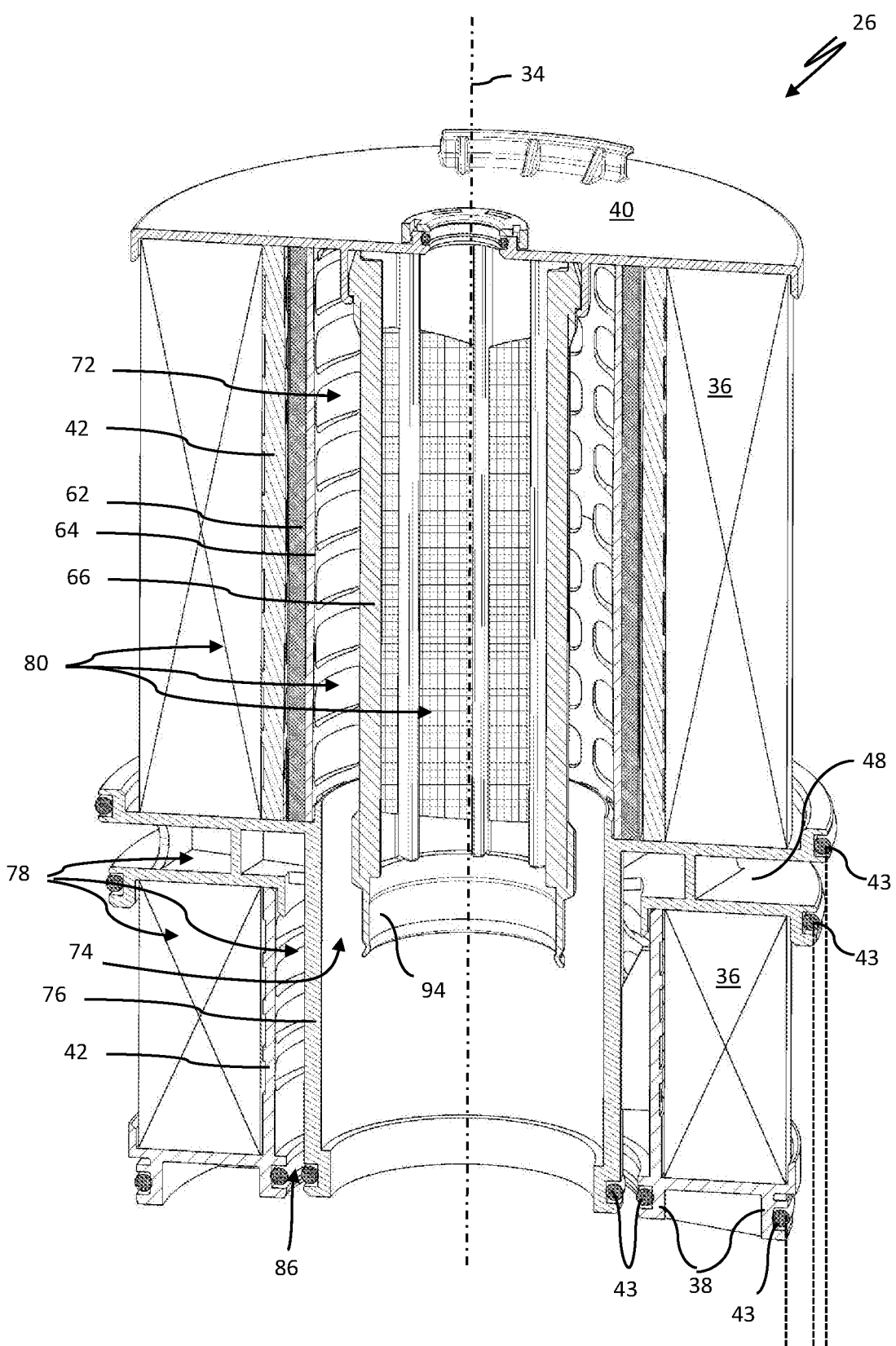
FIG. 3 shows the fuel filter insert of FIG. 1 in an exposed section illustration.

FIG. 3 shows the fuel filter insert 26 of FIGS. 1 and 2 in an exposed illustration and in a longitudinal section. The grid structure of the screen tube 66 can be seen clearly in this illustration. The screen tube 66 is connected, e.g., locked, with the upper end disc 40 of the main filter element 30. The sealing collar 94 of the screen tube 66 can be comprised of an elastically deformable (plastic) material. The sealing collar 94 can thus be pushed seal-tightly onto the tubular element 88 upon axially oriented introduction of the fuel filter insert 26 into the filter housing 12 (FIGS. 1 and 2) by being guided on the slantedly extending connecting section 90 of the venting tube 92. The lower end disc 38 of the main filter element 30 comprises at the inner circumference a holding stay 114. The holding stay 114 is axially projecting away from the lower end disc 38 in the direction of the upper end disc 40 of the main filter element 30 and supports the central tube 64 on the inner side.

In operation of the fuel filter 10, the unfiltered fuel that is sucked in by the fuel pump flows through the fuel inlet 22 of the filter housing 12 into the prefilter chamber 44 and passes through the filter medium 36 of the prefilter element 28 in radial direction from the exterior to the interior. Due to the tubular wall element 76 of the main filter element 30, the fuel flows via the flow channel 48 and the lateral fuel outlet 54 of the filter housing 12 into the fuel pump 56. By means of the fuel pump 56 which is fluidically interconnected between the fuel outlet 54 and the fuel inlet 58, the prefiltered fuel is pumped into the main filter chamber 46 of the filter housing 12. The prefiltered fuel flows through the filter medium 36 of the main filter element 30, the coalescing medium 62, and the screen tube 66 in a radial direction relative to the longitudinal axis 34 of the fuel filter insert 26 from the exterior to the interior. In doing so, the water contained in the fuel is at least partially separated from the fuel and flows, following the force of gravity, from the water separating gap 72 through the water discharge channel 74 in downward direction into the water collecting chamber 84 of the filter housing 12. The fuel, from which contaminants have been removed in this way, flows through the fuel channel 70 out of the fuel filter 10 and can be supplied to an internal combustion engine or a fuel injection pump.

For exchange of the fuel filter insert 26, in a first step the housing cover 18 is removed from the filter cup 14. The bayonet connection 41 between the housing cover 18 and the fuel filter insert 26 is closed or becomes closed due to the screwing movement of the housing cover 18. The fuel filter insert 26 as a whole is moved due to the screwing movement axially in the direction of the longitudinal axis 32 of the filter housing 12 out of its installation position (FIGS. 1 and 2). As soon as the fuel filter insert 26 is in the drainage position, the raw-side (prefiltered) fuel flows out of the main filter chamber 46 of the filter housing 12 into the prefilter chamber 44 and together with the raw-side fuel contained therein flows via the fuel discharge channel 106 into the fuel return 24 as well as, as the case may be, into a fuel tank fluidically connected therewith. Upon further unscrewing or lifting off of the housing cover 18 from the filter cup 14 together with the fuel filter insert 26, the inner sealing element 43 of the wall element 76 as well as the sealing element 43 of the lower end disc 38 of the prefilter element 28 which is contacting the water discharge socket 82 are moved out of their seal-tight contact at the water discharge socket 82. A possibly present liquid level of a fuel water mixture at the clean side can then flow in radial direction outwardly into the fuel discharge channel 106 and can flow out of the filter housing 12 via the fuel return 24. After complete removal of the fuel filter insert 26 from the filter cup 14, the fuel filter insert 26 is decoupled from the housing cover 18 and a new fuel filter insert 26 is fastened to the housing cover 18. The fuel filter insert 26 is inserted subsequently in the insertion direction into the filter cup 14 and, by screwing the housing cover 18 onto the filter cup 14, is transferred into its installation position (FIGS. 1 and 2).

What is claimed is:

1. A fuel filter insert for a fuel filter, the fuel filter insert comprising:
   a prefilter element; and
   a main filter element arranged atop the prefilter element in an axial direction relative to a longitudinal axis of the fuel filter insert;
   the main filter element comprising a water separating unit configured to separate water contained in a fuel to be filtered;
   the water separating unit comprising a water discharge channel for water separated from the fuel,
   wherein the water discharge channel is extending in the axial direction at least partially through the prefilter element;
   wherein the fuel filter insert further comprises:
     a flow channel for fuel that has been prefiltered by the prefilter element,
     wherein the flow channel is arranged between the prefilter element and the main filter element,
     wherein the flow channel is immediately delimited in the axial direction by an end disc of the prefilter element that is facing the main filter element and by an end disc of the main filter element that is facing the prefilter element.

2. The fuel filter insert according to claim 1, further comprising
   a wall element disposed on the main filter element and extending in the axial direction away from the main filter element,
   wherein the water discharge channel is delimited outwardly in a radial direction relative to the longitudinal axis by the wall element.

3. The fuel filter insert according to claim 2, wherein the main filter element comprises a lower end disc and wherein the wall element is attached to the lower end disc.

4. The fuel filter insert according to claim 3, wherein the wall element is integrally formed on the lower end disc.

5. The fuel filter insert according to claim 2, wherein the prefilter element comprises a lower end disc that is facing away from the main filter element,
a first sealing collar arranged on a radially inner side of the lower end disk of the prefilter element;
a second sealing collar arranged on a radially outer side of the wall element;
wherein a receiving slot is arranged between the first sealing collar and the second sealing collar;
wherein the wall element and the lower end disc of the prefilter element together delimit the receiving slot which is configured to receive a water discharge socket of a filter housing with the first and second sealing collars sealing against the water discharge socket of the filter housing.

6. The fuel filter insert according to claim 1, wherein the water separating unit of the main filter element comprises
a water separating gap comprising an end that is fluidically connected to the water discharge channel.

7. The fuel filter insert according to claim 6, wherein the main filter element comprises
a screen tube and
a filter medium,
wherein the water separating gap is formed between the screen tube and the filter medium of the main filter element.

8. The fuel filter insert according to claim 1, wherein the water separating unit comprises a coalescing medium.

9. The fuel filter insert according to claim 8, wherein the coalescing medium is arranged fluidically downstream of a filter medium of the main filter element.

10. The fuel filter insert according to claim 1, wherein the end disc of the prefilter element that is facing the main filter element and the end disc of the main filter element that is facing the prefilter element are connected with each other to enable common removal of the prefilter element and the main filter element from a filter housing.

11. The fuel filter insert according to claim 10, wherein the end disc of the prefilter element that is facing the main filter element and the end disc of the main filter element that is facing the prefilter element are formed together as one piece.

12. A fuel filter comprising:
a filter housing;
a fuel filter insert disposed in the filter housing and comprising
a prefilter element and
a main filter element arranged atop the prefilter element in an axial direction relative to a longitudinal axis of the fuel filter insert,
wherein the main filter element comprises
a water separating unit configured to separate water contained in a fuel to be filtered, and
wherein the water separating unit comprises a water discharge channel for water separated from the fuel,
wherein the water discharge channel is extending in the axial direction at least partially through the prefilter element;
wherein the water discharge channel of the fuel filter insert is fluidically connected with a water collecting chamber of the filter housing;
wherein the fuel filter insert further comprises:
a flow channel for fuel that has been prefiltered by the prefilter element,
wherein the flow channel is arranged between the prefilter element and the main filter element,
wherein the flow channel is immediately delimited in the axial direction by an end disc of the prefilter element that is facing the main filter element and by an end disc of the main filter element that is facing the prefilter element.

13. The fuel filter according to claim 12, wherein the fuel filter insert further comprises
a wall element disposed on the main filter element and extending in the axial direction away from the main filter element,
wherein the water discharge channel is delimited outwardly in a radial direction relative to the longitudinal axis by the wall element,
wherein the prefilter element comprises a lower end disc that is facing away from the main filter element,
a first sealing collar arranged on a radially inner side of the lower end disk of the prefilter element;
a second sealing collar arranged on a radially outer side of the wall element;
wherein a receiving slot is arranged between the first sealing collar and the second sealing collar;
wherein the wall element and the lower end disc of the prefilter element together delimit the receiving slot;
wherein the filter housing comprises
a water discharge socket fluidically connected with the water collecting chamber of the filter housing,
wherein the water discharge socket is seal-tightly projecting into the receiving slot between the first and second sealing collars, the first and second sealing collars sealing against the water discharge socket.

14. The fuel filter according to claim 13, wherein the water discharge channel is delimited inwardly in the radial direction by a tubular element.

15. The fuel filter according to claim 14, wherein the tubular element is part of a screen tube of the water separating unit.

16. The fuel filter according to claim 14, wherein the tubular element is part of a venting tube arranged in an interior of the fuel filter insert.

17. The fuel filter according to claim 16, wherein the venting tube is fastened on the filter housing.

18. The fuel filter according to claim 16, wherein the venting tube is locked or screw-connected by the tube element to the filter housing.

19. The fuel filter according to claim 16, wherein the venting tube comprises an end that opens into a fuel return of the filter housing,
wherein the fuel return is fluidically connectable with a fuel tank.

20. A fuel filter comprising:
a filter housing;
a fuel filter insert disposed in the filter housing and comprising
a prefilter element and
a main filter element arranged atop the prefilter element in an axial direction relative to a longitudinal axis of the fuel filter insert,
wherein the main filter element comprises
a water separating unit configured to separate water contained in a fuel to be filtered, and wherein the water separating unit comprises a water discharge channel for water separated from the fuel,
wherein the water discharge channel is extending in the axial direction at least partially through the prefilter element;
wherein the water discharge channel of the fuel filter insert is fluidically connected with a water collecting chamber of the filter housing;
wherein the fuel filter further comprises:
a fuel pump,
wherein the filter housing comprises
a lateral fuel outlet connected to the prefilter element and
a lateral fuel inlet connected to the main filter element,
wherein the pump is connected between the lateral fuel outlet and the lateral fuel inlet,
wherein the fuel filter insert further comprises
a flow channel for fuel that has been prefiltered by the prefilter element,
wherein the flow channel is arranged between the prefilter element and the main filter element,
wherein the flow channel is immediately delimited in the axial direction by an end disc of the prefilter element that is facing the main filter element and by an end disc of the main filter element that is facing the prefilter element,
wherein said end disc of the prefilter element and said end disc of the main filter element are seal-tightly contacting an inner side of the filter housing, and
wherein the flow channel is fluidically connectable by the lateral fuel outlet with the fuel pump to pump the fuel prefiltered by the prefilter element through the fuel inlet to the main filter element.

* * * * *